Oct. 14, 1958

M. M. SEELOFF ET AL 2,856,512

STITCH WELDING APPARATUS

Filed June 26, 1956

INVENTOR
MELVIN M. SEELOFF
ALFONCE F. KEYSER
BY Francis J. Klempay
ATTORNEY

Oct. 14, 1958

M. M. SEELOFF ET AL 2,856,512

STITCH WELDING APPARATUS

Filed June 26, 1956

INVENTOR
MELVIN M. SEELOFF
ALFONCE F. KEYSER
BY
Francis J. Klempay
ATTORNEY

INVENTOR
MELVIN M. SEELOFF
ALFONCE F. KEYSER
BY Francis J. Klempay
ATTORNEY

United States Patent Office 2,856,512
Patented Oct. 14, 1958

2,856,512

STITCH WELDING APPARATUS

Melvin M. Seeloff and Alfonce F. Keyser, Warren, Ohio, assignors to The Taylor-Winfield Corporation, Warren, Ohio, a corporation of Ohio Application June 26, 1956, Serial No. 593,976

20 Claims. (Cl. 219—86)

The present invention relates in general to electric resistance spot welding machines and more particularly to an electrode-carrying stitch welding head for such machines that will provide an infinitely variable pattern of overlapped or spaced spot welds on the workpiece being welded. Prior art mechanisms of the type contemplated have been limited to producing circular patterns of welds with the radius of the circular pattern being adjustable. In this invention, as will be more readily apparent, the stitch welding apparatus is infinitely adjustable to obtain any pattern or contour of weld which is desired. As an example, the stitch welding head may be employed to obtain circular, elliptical, or other shaped patterns of welds having any predetermined size.

Yet a further object of the invention is to provide apparatus of the character described wherein the spacing between successive welds may be accurately and precisely controlled to obtain overlapped or spaced spot welds depending upon the type of weld needed for any given welding operation.

Another object of the invention is to provide improved means for indexing the electrode carried by the stitch welding apparatus whereby the same is indexed at predetermined times in an improved manner to move the electrode in a preselected pattern.

An important object of the invention is to provide stitch welding apparatus for electric resistance spot welders which is of rugged and simplified construction whereby the same is easily manufactured and assembled but yet is adapted for continuous and sustained operation. This results in an economically efficient mechanism which allows maximum utilization of the same.

These objects, as well as other objects and advantages of the invention, will become apparent upon consideration of the following detailed specification and accompanying drawing wherein is disclosed and shown a preferred embodiment of the invention.

Figure 1:
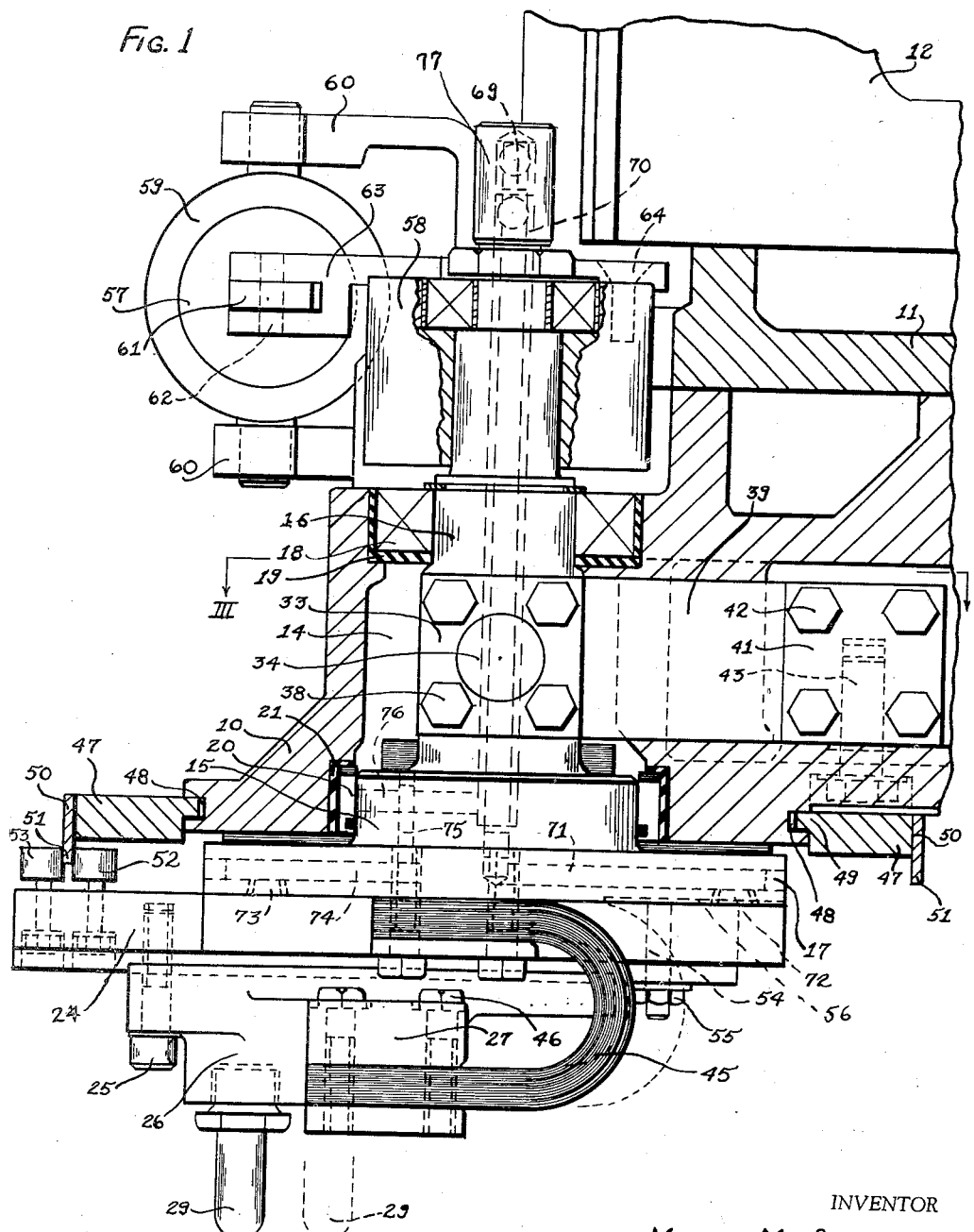
Figure 1 is a side elevation, partially in section, of new and novel stitch welding apparatus constructed in accordance with the teachings of the present invention.

Referring now to the drawing, and initially to Figure 1 thereof, the new and novel stitch welding apparatus of the present invention comprises a main housing 10 having a configuration as shown which is rigidly attached to a terminal connecting member 11 by bolts, not specifically shown, or some other convenient attachment means, while the connecting member 11 is in turn securely bolted to the bottom face of a ram 12 of a spot welding machine. As is conventional in this type of welder the ram 12 is adapted for vertical movement by an air cylinder, not shown, and thus the main housing 10 is actuated in the same manner.

Housing 10 is formed with a large vertical bore 14 therein which rotatably receives a protruding and vertically extending inverted T-shaped spindle 15. This spindle has a main shaft portion 16 and a protruding disc portion 17 and is journaled in the bore 14 by a large ring-like bearing 18 which is insulated from the main housing 10 by a layer of insulation 19. The spindle 15 is further journaled near its disc portion 17 by an annular bearing member 20 which is also surrounded by a ring of insulation 21.

Figure 2:
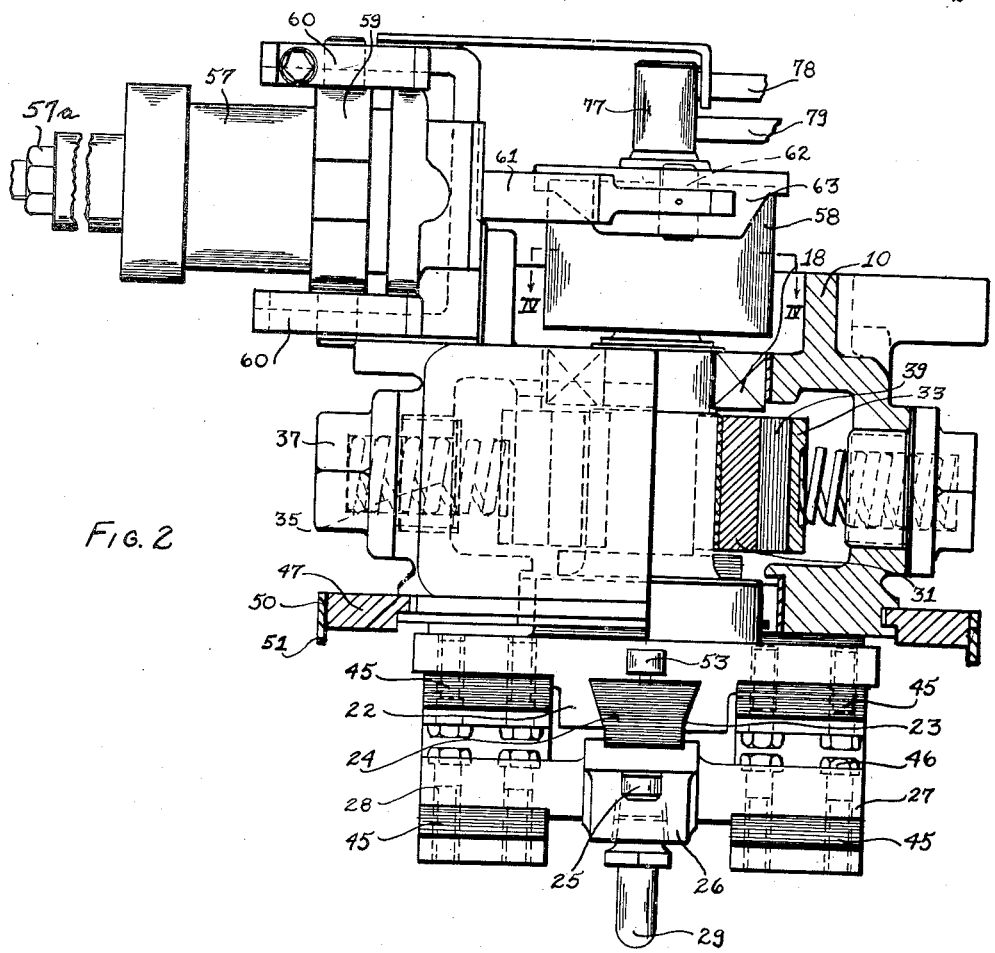
Figure 2 is a front view, partially in section, of the apparatus of Figure 1.

As evidenced in Figure 2 of the drawing, the disc portion 17 of the spindle 15 has a greater thickness or boss along one diameter at 22 in order that a dove-tailed way 23 can be formed in the bottom thereof. Slidably received in the way 23 is a cooperating slide 24 which is made from any electrical insulating material. Depending from, and rigidly secured to the slide 24 by bolt 25, is an electrode mounting block 26 having the laterally extending arms 27 and 28. An electrode 29 is attached to the bottom face of the mounting block 26 in a conventional manner so that this electrode may cooperate with a stationary electrode, represented schematically in the drawing at 30, for the welding of workpieces.

Considering now the apparatus employed to supply electrical energy to the electrode 29, the connecting member 11 is attached through suitable conductors and fittings to one side of a welding transformer or other suitable source, not specifically shown, so that during welding operations current flows from the source to the connecting member 11 and thence to the main housing 10. For transferring the current to the spindle 15 there are provided a pair of spring loaded contact shoes 31 having the bearing faces thereof formed with a curvature to bear against the spindle 15 and fitted with silver linings 32 to insure proper contact. Each of the shoes 31 has a back cover plate 33 which is formed with a recess 34 therein to receive one end of a large spring 35. The other end of each of the springs 35 is effectively mounted in a recess 36 provided in a large capping nut 37 which is in turn mounted on the main housing 10 in the manner shown. Clamped between each of the contacting shoes 31 and the back cover plates 33 by the four bolts 38 are flexible conductor bands 39 which extend rearwardly and terminate with their other ends clamped between a large block 40 and a plate 41 by a plurality of bolts 42. Current is supplied from the main housing 10 to the large block 40 (which is bolted securely to housing 10 by a pair of vertically extending bolts 43) and then through the flexible conductors 39 to the contacting shoes 31 and the spindle 15. Good electrical contact is always insured by the springs 35 urging the contacting shoes into engagement with the spindle 15 and it is noted that the entire transferring means is one of simplicity and rugged construction.

The electrical current therefore flows through the spindle 15 but is prohibited from arcing across the bearings 18 and 20 by the layers of insulation 19 and 21. To transfer the current to the welding electrode 29 there are provided a pair of grouped flexible band conductors 45 attached at one end to the bottom face of the disc portion 17 of the spindle 15 on either side of the boss 22 and on the other ends, by bolts 46, to the laterally extending arms 27 and 28 of the electrode mounting block 26. This arrangement affords excellent electrical contact between the spindle 15 and the electrode 29 but yet allows the insulated and elongated slide 24 freedom of movement in the way 23 as is apparent.

The movement of the slide 24, and hence the pattern of motion imparted to the welding electrode 29, is controlled by the new and novel cam arrangement of the present invention comprising an annular ring 47 whose inner diameter is concentric about the axis of the spindle 15 and the main housing 10 which is notched at 48 to receive the tongue projection 49 of the ring 47 in the manner shown in Figures 1 and 2 of the drawing. At the point of juncture between the housing 10 and the annular ring 47 the housing has a circular outer periphery but it will be apparent that the outer periphery of the ring 47 may have any desired contour to obtain the desired pattern of weld as will be hereinafter explained. In the present embodiment the outer periphery of the ring 47 is shown to be elliptical in contour but any other contour is within the scope of the invention. Attached to the outer edge of the ring 47 is a band 50 of greater thickness than the ring to expose a downwardly depending cam projection 51. Ring 47 is formed of two separable halves as shown at 47a—being held together by the band 50 which is tensioned by a clamp 50a. This arrangement greatly facilitates interchanging of ring and band assemblies when setting up the machine for different products requiring different patterns of welds.

Rigidly attached to the extreme forward end of the elongated and insulated slide 24 are a pair of upwardly extending and aligned rollers 52 and 53 adapted to ride on the inner and outer surfaces, respectively, of the projection 51. As the spindle 15 is rotated, in a manner to be hereinafter more fully explained, the electrode 29 is caused to move in a pattern of motion dependent upon the contour of the ring 47 and projection 51 since these parts are stationary with respect to the inverted T-shaped spindle 15. The slide 24 will move back and forth in the way 23 as the rollers 52 and 53 move around the projection 51 to define the pattern of weld.

For the special case where a circular pattern of weld is desired there is provided apparatus for effecting this type of weld irrespective of the contour of the ring 47 and the projection 51. This is accomplished by including a threaded rod 54 and a lock nut 55 carried on the elongated slide 24 and adapted to cooperate with a slot 56 in the bottom of the spindle 15 to lock the slide securely in one position. The cam rollers 52 and 53 would, of course, be removed so that there is no tendency for the slide 24 to move in the way 23. The radius of any given circular pattern of weld can easily be preselected by the relative positions of the slide 24 in the way 23 as this controls the distance the welding electrode 29 is off center from the axis of the spindle 15.

Figure 4:
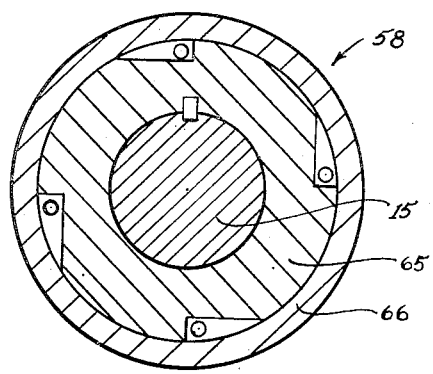
Figure 4 is a plan sectional view as seen from the section line IV—IV of Figure 2 showing an over-running clutch utilized in the stitch welding apparatus.
Figure 3:
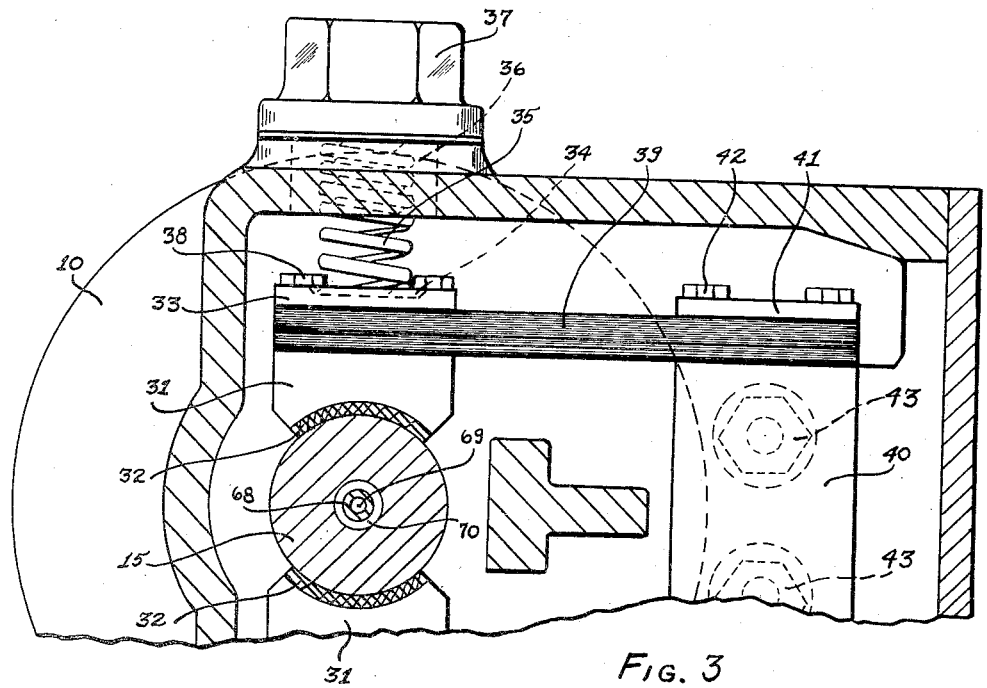
Figure 3 is a plan sectional view taken along the section line III—III of Figure 1 depicting specifically a pair of spring-loaded current conducting shoes.

Some means must be provided for intermittently rotating or indexing the spindle 15 and in the present instance this is afforded by an adjustable stroke fluid cylinder 57 acting through an over-running clutch 58. The cylinder 57 is mounted by a mounting ring 59 between a large clevis 60 extending from the main housing 10 and has a plunger rod 61 which is pivotally connected by a pin 62 to a lever 63. The lever 63 is in turn attached to an outer race of the over-running clutch 58 by screws 64. The over-running clutch 58 is of the multiple roller type well known in the art and is shown in detail in Figure 4 of the drawing to comprise an inner member 65 which is keyed to the spindle 15 and an outer race 66 whose flanges revolve freely around the spindle 15 outwardly of the inner member 65. The arrangement is such that the spindle 15 will be rotated upon actuation of the plunger rod 61 in one direction but will not rotate as the rod is returned to its original position due to the over-running nature of the clutch 58.

It is conventional in apparatus of the type described to provide means for circulating coolant throughout both the spindle 15 and the electrode mounting block 26 as well as the electrode proper. A preferred method of cooling the spindle 15 is to bore the same throughout the greater portion of its length along the axis and insert a tubular member 68 thereinto to form a pair of concentric passageways 69 and 70. The tubular member 68 is longer than the original bore and the disc portion of the spindle 15 is radially tapped at 71 to form a passageway communicating with a port 72. The outer passageway 70 is connected to a port 73 by a plurality of passageways 74—76 and suitable conduits, not specifically shown, would be employed to interconnect the ports 72 and 73. The top end of the spindle 15 and the tubular member 68 is covered by a standard rotary fluid coupling 77 having inlet and outlet openings 78 and 79 for connection to a suitable source of coolant. Thus, the cooling fluid can be circulated through the various and numerous passageways and conduits above described to cool the spindle 15. Also, block 26 may be provided with passageways connected to flexible hose whereby the block is cooled. Of course, O-rings and other fluid sealing means would be provided throughout the apparatus at strategic positions to effect fluid tight passageways, prevent leakage, etc. in the well known manner.

Figure 5:
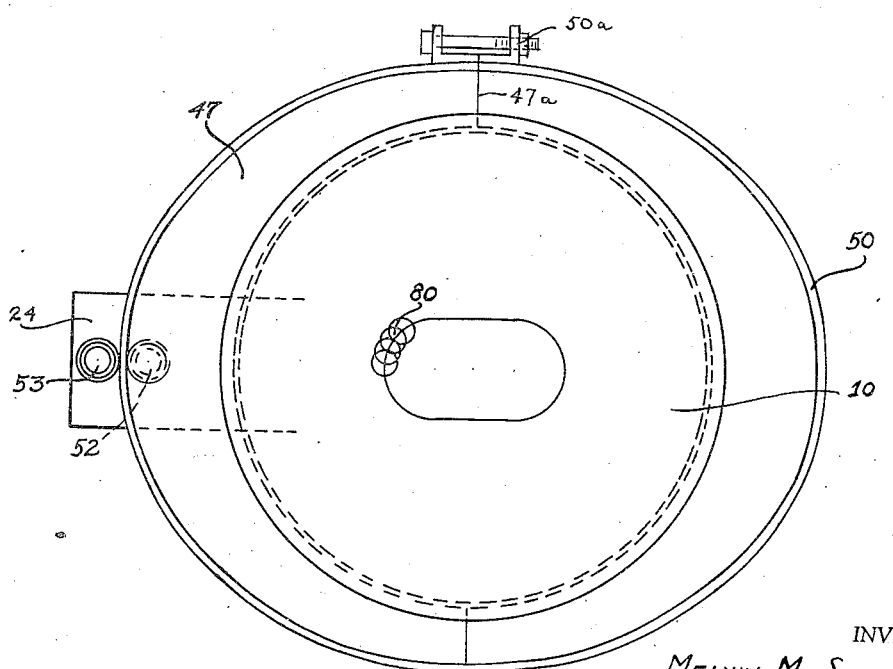
Figure 5 is a schematic plan view showing one welding pattern obtainable with the assembly.

Considering now the operation of the apparatus, reference is made to Figures 1 and 5 of the drawing, and it is remembered that the slide 24 is free to move in the bottom of the spindle 15 while the ring 47 and the projection 51 are rigidly mounted with respect to said slide and as a consequence the welding electrode 29. It is assumed that a ring 47 and a projection 51 have been selected having an outer contour which will give the desired pattern of weld, as, for example, an elliptical contour as shown in Figure 5. To effect the first weld the electrode 29 is moved into pressure contact with the workpiece and fixed electrode 30 by downward movement of the welding ram 12 upon actuation of a welding ram air cylinder, not shown. After current has flown for a predetermined time the ram cylinder is actuated to retract the electrode 29 thereby leaving the first completed spot weld. When the electrode is in this retracted position the fluid cylinder 57 is energized to rotate the spindle 15 through a predetermined angular distance. While the spindle 15 is being rotated the slide 24 is caused to move in the way 23 in a manner dependent upon the shape or outer contour of the cam projection 51 and the ring 47 by the rollers 52 and 53 riding around the projection 51. The welding ram 12 is then moved downwardly so that the electrode 29 again engages the workpiece and current is supplied to complete the second weld. During the interval between the indexing of the spindle 15 and the raising of the electrode 29 from the workpiece the cylinder is again actuated to return its plunger rod 61 to the original position but the spindle 15 does not rotate due to the over-running nature of the clutch as previously explained.

This series of indexing and welding operations are continued until an elliptical pattern, defined by the shape of the ring 47 and the projection 51, as shown at 80 in Figure 5, is obtained. It is noted that the spacing between the successive welds can be accurately and precisely controlled by adjusting the stroke of the fluid cylinder 57. The stroke of the cylinder 47 can be readily adjusted, in accordance with usual practice, by adjustment of a nut 57a on an exposed end portion of the cylinder rod. The apparatus outlined above is very versatile in that it is possible to obtain almost any given pattern of weld by changing the ring 47 and the projection 51 as required. When a circular weld is desired the slide can be locked in the way 23 with the utmost ease and the rollers 52 and 53 are removed to afford this particular type of operation.

An important operational advantage of the assembly of the invention is that the rotatable electrode carrier as indexed by the cylinder 57 acting through the clutch 58 is, at all times, frictionally retained in indexed position by the spring-placed electrical contact shoes 31 which clamp about the spindle 15. This effectively prevents counter-rotation of the rotatable electrode carrier during free wheeling of the clutch 58 and, further, insures that the parts are held in proper indexed position during reciprocation of the welding head of the machine.

It should thus be apparent that we have accomplished the objects initially set forth by providing a new and novel electrode-carrying stitch welding head. Such heads may be manufactured in quantity with only the shape of the ring and projecting cam being different for each machine as dictated by its ultimate use. Obviously, the apparatus can be easily and economically manufactured in this manner when compared to the stitch welding heads of the prior art.

Although I have shown and described a specific embodiment of the invention it is apparent that many changes may be made therein without departing from its scope. Reference should therefore be made to the following appended claims in determining the coverage of the invention.

I claim:

1. An electrode-carrying stitch welding head adapted to be attached to an electric resistance spot welder comprising a casing, a spindle of substantially inverted T-shaped form rotatably journaled in said casing, journal bearings for rotatably supporting said spindle at spaced points in said casing, means for transferring electrical current to said spindle, a guide way in the bottom face of the head portion of said inverted T-shaped spindle, a slide adapted for movement in said guide way, an electrode attached to said slide, means for transferring electrical current from said spindle to said electrode, a cam member attached to and generally concentric with said casing, said cam member having a preselected outer periphery, cam follower means mounted on said slide and adapted to engage said cam member, and means to intermittently rotate said spindle whereby said electrode is caused to move in a predetermined pattern as said cam follower means moves around said cam.

2. Apparatus according to claim 1 further characterized in that said means to intermittently rotate comprises an over-running clutch having a driven member fixed on said spindle and a driving member mounted for rotation about the principal axis of said spindle and operative to impart rotational movement to said driven member when driven in one direction and to freewheel with respect thereto when rotated in the opposite direction, a lever connected to said driving member, and means to impart reciprocating motion to said lever.

3. Apparatus according to claim 2, further characterized in that said means to impart reciprocating motion comprises an air cylinder, and the piston rod of said cylinder being joined to said lever.

4. An electrode-carrying stitch welding head adapted to be attached to an electric resistance spot welder comprising a main housing having a bore therein, a spindle of generally inverted T-shaped configurations rotatably supported in said bore, a guide way in the bottom face of the head portion of said spindle, an insulated slide received in said guide way and adapted for sliding movement, an electrode mounting block rigidly attached to said slide, an electrode carried by said electrode mounting block, means for intermittently rotating said spindle, and means for moving said slide in said way according to a predetermined pattern when said spindle is rotated to effect a predetermined pattern of spot welds.

5. An electrode-carrying stitch welding head adapted to be attached to an electric resistance spot welder comprising a spindle journaled in a housing, means to transfer electrical current to said spindle, an electrode slidably attached to one end of said spindle, means to rotate said spindle, and cam means operative to slidably move said electrode in a predetermined pattern when said spindle is rotated.

6. Apparatus according to claim 5 further characterized in that said cam means comprises a member arranged generally concentrically about the axis of said spindle, and said member having a predetermined shape defining said predetermined pattern of welds.

7. Apparatus according to claim 5 further comprising cam follower means for said cam means, said spindle having a way therein, a slide slidably received in said way, said electrode being mounted in rigid relation with respect to said slide, and said cam follower means being mounted on said slide.

8. Apparatus according to claim 7 further characterized in that said cam means comprises a member positioned radially outwardly of said housing and rigidly mounted with respect thereto, said member having a predetermined outer periphery, and said cam follower means comprising rollers adapted to ride around said outer periphery.

9. Apparatus according to claim 5 further characterized in that said means for rotating said spindle comprises an over-running clutch having a driven element fixed on said spindle and a driving member mounted for rotation about the principal axis of said spindle and operative to impart rotational movement to said driven element when driven in one direction and to freewheel with respect thereto when rotated in the opposite direction, and means to impart to and fro motion to said driving member whereby said spindle is caused to be intermittently rotated.

10. An electrode-carrying stitch welding head adapted to be attached to an electric resistance spot welder which comprises a spindle journaled in a housing, an electrode slidably attached to one end of said spindle, means to intermittently rotate said spindle including an over-running clutch, and means to slidably move said electrode with respect to the axis of said spindle during intermittent rotation thereof whereby said electrode is caused to follow a predetermined pattern.

11. An electrode-carrying stitch welding head for completing overlapped or spaced spot welds comprising a spindle journaled in a housing, means to intermittently rotate said spindle, an electrode, said electrode slidably mounted on one end of said spindle, and means operative to slidably move said electrode when said spindle is intermittently rotated whereby a predetermined pattern of overlapped or spaced welds is obtained.

12. An electrode-carrying stitch welding assembly for completing overlapped or spaced welds comprising a spindle, means for journaling said spindle, means for rotating said spindle, a guide way in the face of one end of said spindle, an insulated slide received in said guide way and adapted for sliding movement, an electrode mounting block attached to said slide, an electrode carried on said electrode mounting block, and means for moving said slide in said way according to a predetermined pattern when said spindle is rotated to effect a predetermined pattern of spot welds.

13. Apparatus according to claim 12 further characterized by means for transferring current to said spindle and means for transferring current from said spindle to said electrode, said last mentioned means comprising flexible conductors having one set of ends attached to said face on one end of said spindle, and the other sets of ends of said conductors attached to said electrode mounting block.

14. An electrode-carrying stitch welding assembly comprising a member having an axis, means for rotating said member about said axis, an electrode assembly rotatable with said member and movable in a plane normal to the axis of rotation of said member, and means operative to move said electrode in said plane normal according to a predetermined pattern when said member is rotated.

15. Apparatus according to claim 14 further characterized in that said means operative to move comprises cam means, cam follower means operatively connected with said electrode, and said cam follower means adapted to engage said cam means whereby said cam means determines said predetermined pattern.

16. An electrode-carrying stitch welding assembly comprising a member having an axis, means for rotating said member about said axis, an electrode assembly rotatable with said member and movable in a plane normal to the axis of rotation of said member, said means to rotate comprising an over-running clutch for intermittently rotating said member, and means operative to move said electrode in said plane normal in accordance with a predetermined pattern when said member is rotated.

17. An electrode-carrying stitch welding assembly comprising a housing, a spindle journaled in said housing, an electrode slidably attached to said spindle, means to rotate said spindle, means for slidably moving said electrode when said spindle is rotated whereby a predetermined pattern of welds is obtained, said last mentioned means comprising an annular member having a predetermined outer periphery, said annular member comprising a plurality of separate parts, the outer periphery of said housing being notched to receive the inner edges of said separate parts, and means for holding said parts in assembled relation with the inner edges thereof received in the notched portion of said housing.

18. An electrode-carrying stitch welding assembly for completing overlapped or spaced welds comprising a spindle, means to rotate said spindle, an electrode movably mounted on said spindle, means operative to move said electrode when said spindle is rotated whereby a predetermined pattern of overlapped or spaced welds is obtained, said means operative to move comprising cam means, cam follower means operatively connected with said electrode, and said cam follower means adapted to engage said cam means whereby said cam means determines said predetermined pattern.

19. Apparatus according to claim 18 further characterized in that said cam means comprises a plurality of separable parts, and means for holding said plurality of separable parts in assembled relation.

20. Apparatus according to claim 18 further characterized in that said cam means comprises an annular member generally concentric with said spindle and having a predetermined outer periphery, said annular member comprising a plurality of separable parts, a band-like member encircling said annular member, and means for tensioning said band-like member whereby said separable parts are retained in assembled relation.

References Cited in the file of this patent

UNITED STATES PATENTS

| | | |
|---|---|---|
| 978,418 | Winfield | Dec. 13, 1910 |
| 1,767,521 | Eskergian | June 24, 1930 |
| 1,884,644 | Ford | Oct. 25, 1932 |
| 1,946,445 | Ragsdale et al. | Feb. 6, 1934 |
| 2,673,333 | Seeloff et al. | Mar. 23, 1954 |
| 2,710,327 | Powley | June 7, 1955 |